United States Patent [19]

Tarshiani et al.

[11] Patent Number: 5,385,955
[45] Date of Patent: Jan. 31, 1995

[54] ORGANOSILANE COATING COMPOSITION FOR OPHTHALMIC LENS

[75] Inventors: Yassin Y. Tarshiani, Largo; Steven A. Weber, St. Petersburg, both of Fla.

[73] Assignee: Essilor of America, Inc., St. Petersburg, Fla.

[21] Appl. No.: 972,359

[22] Filed: Nov. 5, 1992

[51] Int. Cl.6 ............................. C08F 2/50; C08J 7/06; C08K 3/36; C08K 5/54
[52] U.S. Cl. ............................. 522/31; 522/66; 522/84; 522/170; 522/172; 523/106; 523/107; 351/160 R; 351/159
[58] Field of Search .................. 522/83, 84, 170, 172, 522/31, 66; 523/106, 107; 351/160 R, 159

[56] References Cited

U.S. PATENT DOCUMENTS

| 3,986,997 | 10/1976 | Clark | 428/412 |
| 4,101,513 | 7/1978 | Fox et al. | 522/170 |
| 4,348,462 | 9/1982 | Chung | 522/84 |
| 4,525,421 | 6/1985 | Kubota et al. | 428/412 |
| 5,073,476 | 12/1991 | Meier et al. | 522/66 |
| 5,221,560 | 6/1993 | Perkins et al. | 522/84 |

*Primary Examiner*—Susan W. Berman
*Attorney, Agent, or Firm*—Joseph C. Mason, Jr.; Ronald E. Smith

[57] ABSTRACT

A radiation-curable coating composition for ophthalmic lens is disclosed which comprises a mixture of a monoepoxysilane, colloidal silica, an alkylalkoxysilane or tetraalkoxysilane, and an ultraviolet activated photoinitiator capable of initiating a cationic cure of such composition. The photoinitiator is an aromatic onium salt or an iron arene salt complex.

35 Claims, No Drawings

ORGANOSILANE COATING COMPOSITION FOR OPHTHALMIC LENS

BACKGROUND OF THE INVENTION

1. Field of the Invention

This invention relates, generally, to a coating composition for forming an abrasion-resistant coating for solid substrates such as ophthalmic lens or other optical articles, and more particularly to a monoepoxysilane composition which is easily curable by radiation.

2. Description of Related Art

Synthetic plastic materials have come into wide use as a lightweight, safe material for ophthalmic lens instead of inorganic glass. However, most plastic materials scratch easily, and are susceptible to chemical attack, when compared to inorganic glass optical products.

Thus, protective coatings for plastic substrates which are abrasion resistant are in great demand and of great interest to the art.

The broad application of protective coatings to a lens substrate is known. Typically, these protective coatings are applied to the desired substrate by spin coating, dip coating, spray coating, and flow coating techniques. Vapor coating techniques are also well known, and to a limited extent, certain in-mold techniques have also been practiced.

Many of the prior art abrasion resistant coatings result from thermally activated initiators, which require exposure to elevated temperature in order to fully develop the physical properties of the coating. Unfortunately, these thermally cured coatings do not become tack-free immediately upon being subjected to the elevated temperatures needed for curing. The tack-free state is achieved after the passage of significant time, sometimes hours. This "lag-time" or delay in achieving a tack-free state presents an opportunity for the coating to be marred by various environmental factors, e.g., airborne particulate matter.

In response, the art has utilized radiation-curable abrasion resistant coatings. The technique of radiation cure does result in a coating composition which is tack-free within seconds of irradiation. The current practice is to use radiation for the cure and utilize a free radical polymerization mechanism with various acrylate monomers to achieve the abrasion-resistant coating.

Radiation curable acrylate coatings have drawbacks. Since the acrylate coatings result from free radical polymerization, careful steps must be taken to exclude oxygen during the coating process. If not excluded, oxygen will inhibit the reaction and the coating will have an inferior surface hardness. An oxygen-free environment is expensive and cumbersome to achieve and maintain during the coating process.

It is therefore highly desirable to formulate a coating composition which is radiation-curable and is formulated in a normal environment including air or oxygen, i.e., expensive oxygen removal steps are avoided.

Abrasion resistant coatings resulting from cationic mechanisms are known. Unlike the free radical mechanisms, cationic polymerization is not inhibited by atmospheric oxygen. However, to achieve satisfactory results, some coatings achieved through cationic polymerization still require the acrylate base. Acrylates are notoriously toxic and tend to shrink. This relatively large shrinkage many times results in poor adhesion of the coating to the substrate, and expensive pretreatment of the substrate is required in order to improve the adhesion.

The present invention obtains excellent clarity and physical properties without the use of acrylate-functional silanes or multifunctional acrylate monomers. In the present invention, an abrasion resistant coating which is radiation curable is obtained from a monoepoxysilane by utilizing acidic colloidal silica, a silane crosslinker, and a cationic photoinitiator as the only required initiator.

SUMMARY OF THE INVENTION

In accordance with the present invention, a coating composition for imparting abrasion and scratch resistance to solid substrates and in particular, a coating for imparting such resistance to ophthalmic lens.

It is an object of the present invention to provide a novel protective coating to solid substrates and other relatively smooth solid surfaces.

It is another object of the present invention to provide a novel coating composition which imparts abrasion and scratch resistance to ophthalmic lens.

A still further object of the present invention is to provide a radiation-curable coating composition which imparts abrasion and scratch resistance to solid substrates and other relatively smooth solid surfaces.

Still another object of the present invention is to provide a radiation-curable coating composition for ophthalmic lens.

Another object of this invention is to provide an ophthalmic lens coated with a radiation-curable coating composition which imparts abrasion and scratch resistance to the coated lens.

It is a feature of this invention to have a UV curable coating composition which rapidly yields a tack-free film which is further cured to a substantially non-tintable, abrasion resistant coating with excellent adhesion.

Other and further objects and features of the present invention will be apparent from the description that follows:

In general, the present invention contemplates a radiation-curable coating composition comprising a monoepoxysilane, colloidal silica, an alkyltrialkoxysilane or tetraalkoxysilane, and an ultraviolet photoinitiator capable of initiating a cationic cure of such composition. The photoinitiator is a photosensitive aromatic onium salt or an iron arene salt complex. The preferred photoinitiator comprises an iron arene salt complex.

More particularly, the present invention provides a substantially non-tintable coating composition for an optical lens to render the lens resistant to abrasion comprising 5 to 25 parts by weight of a hydrolyzable monoepoxysilane, 2.5 to 7 parts by weight of an alkyltrialkoxysilane or tetraalkoxysilane, 2.5 to 50 parts by weight of colloidal silica, 0.1 to 3 parts by weight of an ultraviolet activated photoinitiator sufficient to initiate a cationic cure of such composition, and 50 to 90 parts by weight of solvent.

Also, in general, the present invention contemplates ophthalmic lens coated with the novel composition of this invention.

DESCRIPTION OF THE PREFERRED EMBODIMENTS

The present invention relates to a coating composition curable to a tack-free state upon irradiation with ultraviolet radiation, comprising a monoepoxysilane of the formula

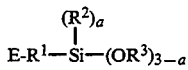

wherein E is a group containing a glycidoxy group or an epoxycyclohexyl group, or a mixture of both; $R^1$ is an alkylene group containing from 1 to 4 carbon atoms; $R^2$ and $R^3$ are alkyl groups containing from 1 to 4 carbon atoms; and a is an integer of 0 or 1; an aqueous, aqueous—alcoholic or alcoholic dispersion of colloidal silica; a crosslinking agent; and a photoinitiator for an ultraviolet activated cationic cure.

More specifically, the coating composition of the present invention comprises (a) a hydrolyzable monofunctional monoepoxysilane consisting of a compound of the general formula

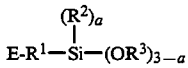

wherein E is a group containing a glycidoxy group or an epoxycyclohexyl group, or a mixture of both; $R^1$ is an alkylene group containing from 1 to 4 carbon atoms; $R^2$ and $R^3$ are alkyl groups containing from 1 to 4 carbon atoms; and a is an integer of 0 or 1, (b) an acidic dispersion of colloidal silica, (c) an alkyltrialkoxysilane or tetraalkoxysilane, and, (d) an ultraviolet radiation activated photoinitiator.

The alkyltrialkoxysilane or tetraalkoxysilane is of the general formula

wherein $R^4$ is alkyl group containing from 1 to 2 carbon atoms, x is an integer of 0 or 1, and, $R^5$ is an alkyl group containing from 1 to 2 carbon atoms.

In other aspects, the present invention provides a substantially non-tintable coating composition for ophthalmic lens to render the lens resistant to abrasion comprising:

(1) 5 to 25% by weight of a hydrolyzable monofunctional organoalkoxysilane selected from the group consisting of a compound of the general formula

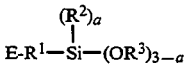

wherein E is a group containing a glycidoxy group or an epoxycyclohexyl group, or a mixture of both; $R^1$ is an alkylene group containing from 1 to 4 carbon atoms; $R^2$ and $R^3$ are alkyl groups containing from 1 to 4 carbon atoms; and (a) is an integer of 0 or 1.

(2) 2.5 to 7% by weight of a crosslinking agent of the general formula

wherein $R^4$ is an alkyl group containing from 1 to 2 carbon atoms, x is an integer of 0 or 1, and, $R^5$ is an alkyl group containing from 1 to 2 carbon atoms, (3) 2.5 to 50% by weight of colloidal silica disposed in water, alcohol or alcohol-water mixtures, (4) 0.1 to 3% by weight of an ultra-violet activated photoinitiator capable of initiating a cationic cure and which is a photosensitive aromatic onium salt or is an iron arene salt complex, (5) 0.05 to 0.25% by weight of a surface active agent; and, (6) 50 to 90% by weight solvent.

The monoepoxysilanes are commercially available and include, for example, monoepoxysilanes available from the Specialty Chemicals Division of Union Carbide Chemicals and Plastics Corporation known as A-186 beta-(3,4-epoxycyclohexyl)-ethyltrimethoxysilane, and A-187 (gamma-glycidoxypropyltrimethoxysilane). Another organoalkoxysilane may be obtained from HULS America, Inc., i.e., (3-glycidoxypropyl)-methyl-diethoxysilane. Another example is gamma-glycidoxy-propylmethyldimethoxysilane.

These commercially available monoepoxysilanes are listed solely as examples, and are not meant to limit the broad scope of this invention.

Specific examples of the alkyltrialkoxysilane or tetraalkoxysilane of the present invention include methyltrimethoxysilane, ethyltrimethoxysilane, phenyltrimethoxysilane, phenyltrimethoxysilane, methyltriethoxysilane, ethyltriethoxysilane.

Colloidal silica as used in this invention may have a particle size of 1 nanometer to 1000 nanometers in diameter. Preferred diameter is in the range of 4 to 100 nanometers, more specifically, 10 to 60 nanometers. The silica may be dispersed in or have crystal-like particles in an aqueous, or polar solvent or the combination of both compounds. Preferably, the silica particles are dispersed in acidified water, methanol, isopropanol, ethanol, butanol, polyethylene glycol or combinations thereof.

The pH of the coating composition liquid is maintained between 3 and 5 to prevent gelation. If necessary, the pH can be adjusted by using hydrochloric acid or sodium hydroxide.

The photoinitiators suitable for use in the coating composition of the present invention are those that induce a cationic cure when irradiated with ultraviolet radiation. Suitable photoinitiators are the photosensitive aromatic onium salts which are described in U.S. Pat. Nos. 3,981,897, 4,058,401, 4,138,255 and 4,161,471 the teachings of which are incorporated herein by reference thereto. Examples of suitable photosensitive aromatic onium salts include triphenylselenonium hexafluoroantimonate, triphenylsulfonium hexafluoroantimonate, triphenylsulfonium hexafluorophosphate, and bis (4-dodecylphenyl)-iodonium hexafluoroantimonate. Other cationic photoinitiators may also be used in this invention. A preferred photoinitiator is that produced by the Additives Division of Ciba-Geigy Corp. under the tradename of Irgaure 261, also known as (.ETA. 5-2,4-cyclopentadiene-1-yl) [(1,2,3,4,5,6-.ETA.)-(1-methylethyl) benzene] iron $(1+)$ hexafluorophosphate $(1-)$, and generally referred to herein as an iron arene salt complex. These cationic photoinitiators are particularly effective for initiating a cross-linking reaction upon exposure to ultraviolet radiation such as that provided by UV lamps. The light source of the UV lamp may be mercury arc lamps, middle pressure mercury lamps, high pressure mercury lamps, metal halide lamps and the like. Exposure time to ultraviolet light may range from 1 to 60 seconds, typically, 10 to 30 seconds of exposure is satisfactory.

When preparing a coating composition of the present invention, the total solids content of the composition should, preferably, be between 10% and 50% by weight, with one or a mixture of solvents comprising the remainder of the formulation. Solvents which are useful in the practice of this invention include low molecular weight alcohols or alcohol-water mixtures, such as methanol, butanol, isopropanol and mixtures thereof; ketones, esters, glycol ethers, cellosolve, organic halides, carboxylic acids, aromatic compounds, and mixtures thereof.

The organoalkoxysilane is relatively easily hydrolyzed in water, or in an aqueous solution including hydrochloric acid, sulfuric acid, acetic acid, phosphoric acid, and the like. The hydrolysis may take place in the presence or absence of a solvent, and preferably, may take place utilizing the excess acidic water in the colloidal silica.

In the practice of the present invention, it may be desirable to add to the coating composition a surface active agent. The surfactant may be non-ionic or ionic. Suitable non-ionic surfactants include compounds from fluorochemicals, such as FC-430 manufactured by the 3M Company, fluorinated alkyl alkoxylates, fluorinated alkyl sulfoamide, fluorinated alkyl ester, monoglyceryl series, the sorbitan fatty acid ester series, the cane sugar ester series, the polyoxyethylene ethers of higher alcohol series, the polyoxyethylene esters of higher fatty acids series, the polyoxyethylene ethers of sorbitan esters series, the fatty acid alkanolamide series, the polypropylene and polyoxyethylene series and the like. Concentration of the surfactant should be greater than 0.01 weight percent and preferably between 0.01 weight percent and 5 weight percent. Other additives such as leveling agents, and viscosity modifiers may be included in the coating composition by simple mixing. Examples of useful levelling agents are silicon surfactants such as a copolymer of lower alkylene oxide and lower polydimethysiloxane.

The transparent substrate preferably used in the present invention include acrylic resins, polycarbonates, diethylene glycol bisallyl carbonate polymers, (halogenated) bisphenol A di(meth)acrylate homopolymers and copolymers, and (halogentated) bisphenol A urethane-modified di(meth) acrylate homopolymers and copolymers and polyurethane. The substrate itself can be tinted, if desired, by means known to the art; although the coating composition of the present invention is substantially non-tintable.

The thickness of the coating composition as applied to the substrate can be selected within a broad range to meet the predetermined purpose or objective; but, typically, the range of 0.5 to 10 microns thick coating, preferably between 2 to 5 microns, offer excellent abrasion resistance to a lens substrate coated therewith. The coating may be applied by conventional methods such as brushing, rolling, spraying, spinning, and dipping.

The physical properties tested in the examples given below are Bayer Abrasion resistance, steel wool scratch resistance, and cross-hatch adhesion.

Bayer Abrasion resistance is determined by measuring the percent haze of a coated and uncoated lens, before and after testing on an oscillating sand abrader as in ASTM #F735-81. The abrader is oscillated for 300 cycles with approximately 500g of sand, retained by #8 and #14 size mesh, used. The haze is measured with a Pacific Scientific Hazemeter model XL-211. The ratio of the uncoated lens haze (final—initial) to the coated lens haze (final—initial) is a measure of the performance of the coating, with a higher ratio signifying a higher abrasion resistance. The following schedule is used for reporting Bayer Abrasion values for the examples given below: A=ratio of 4.4 or higher; B=ratio of 3.0 to 4.4; C—ratio of 1.5 to 2.9; D=ratio of less than 1.5.

Steel wool scratch resistance was determined as follows: the lens was mounted coated surface up with double sided tape on the end of a one inch diameter pivoting rod. Steel wool (000 grade) was then pressed against the coated surface with a five pound weight as back-pressure. The lens was then oscillated for 200 cycles against the steel wool (one inch travel), and the haze measured. The difference in haze (final—initial) as measured on a Pacific Scientific Hazemeter model XL-211 is reported as the steel wool scratch resistance value according to the following schedule: A=0–0.15; B=0.16–0.30; C=0.31–0.50; D=greater than 0.50.

Coating adhesion was measured by cutting through the coating a series of 10 lines, spaced 1 mm apart, with a razor, followed by a second series of 10 lines, spaced 1 mm apart, at right angles to the first series, forming a crosshatch pattern. After blowing off the crosshatch pattern with an air stream to remove any dust formed during the scribing, clear cellophane tape was then applied over the crosshatch pattern, pressed down firmly, and then rapidly pulled away from coating in a direction perpendicular to the coating surface. Application and removal of fresh tape was then repeated two additional times. The lens was then subjected to tinting to determine the percentage adhesion, with tinted areas signifying coating adhesion failure.

The following examples are set forth for illustrative purposes and should not be construed as limiting the scope of this invention. In the following examples, parts refers to parts by weight.

EXAMPLE 1

Preparation of hydrolyzed beta-(3,4-epoxycyclohexyl) ethyltrimethoxy-2-silane

With stirring, 219 parts of an aqueous solution of 0.10N HCl was slowly added to 1000 parts of beta-(3,4 epoxycyclohexyl)-ethyl-trimethoxysilane over the course of one hour. After the addition of the aqueous solution was complete, the resulting solution was stirred at room temperature for 24 hours.

A composition was prepared by mixing 52.70 parts hydrolyzed beta-(3,4-epoxycyclohexyl) ethyltrimethoxysilane with 10.41 parts methyltrimethoxysilane crosslinker, 15.74 parts aqueous colloidal silica (1034-A; Nalco Chemical Co.), 0.27 parts of a fluorosurfactant, 59.37 parts acetone, and 59.37 parts methanol. Next was added 2.13 parts General Electric UV9310C photoinitiator, and the resulting solution again mixed. After filtering, the composition was applied to cured diallyl diglycol carbonate lenses which were then passed under two Fusion Systems "D" bulbs for an irradiation time of 30 seconds, whereupon the coating was dry, aberration free, and tackfree to the touch. The lenses were then postcured for 3 hours at 105° C. After cooling to room temperature, physical tests were performed, and are listed in Table 1.

EXAMPLE 2

Preparation of hydrolyzed gamma-glycidoxypropyltrimethoxysilane

With stirring, 228 parts of an aqueous solution of 0.10N HCl was slowly added to 1000 parts of gamma-glycidoxypropyltrimethoxy-silane over the course of one hour. After the addition of the aqueous solution was complete, the resulting solution was stirred at room temperature for 24 hours. A composition was prepared by mixing 25.34 parts hydrolyzed gamma-glycidoxypropyltrimethoxysilane with 15.36 parts methyltrimethoxy-silane crosslinker, 44.80 parts 1034-A colloidal silica, 0.13 parts of a fluorosurfactant, and 212.84 parts acetone. After mixing the resulting solution, 1.54 parts General Electric UV9310C photoinitiator was added, and the solution again mixed. After filtering, the composition was applied to cured diallyl diglycol carbonate lenses, which were then irradiated and postcured in a manner identical to that described in example 1. Physical testing results are listed in Table 1.

TABLE 1

| Example | Bayer Abrasion | Steel Wool | Adhesion |
|---|---|---|---|
| 1 | D | B | 100% |
| 2 | C | B | 100% |
| 3 | C | A | 100% |
| 4 | B | B | 100% |
| 5 | B | B | 100% |
| 6 | B | A | 100% |
| 7 | A | A | 100% |
| 8 | A | A | 100% |
| 9 | A | A | 100% |

| Bayer values | Steel wool values |
|---|---|
| A = >4.4 | A = 0–0.15 |
| B = 3.0–4.4 | B = 0.16–0.30 |
| C = 1.5–2.9 | C = 0.31–0.50 |
| D = <1.5 | D = >0.50 |

EXAMPLE 3

A composition was prepared by mixing 47.05 parts hydrolyzed gamma-glycidoxypropyltrimethoxysilane with 14.68 parts methyltrimethoxy-silane crosslinker, 22.21 parts 1034-A colloidal silica, 0.02 parts of a fluorosurfactant, and 213.60 parts methanol. After the resulting solution was thoroughly mixed, 1.88 parts General Electric UV9310C photoinitiator was added, and the solution mixed and then filtered. The composition was then applied to cured diallyl diglycol carbonate lenses, which were then irradiated and postcured in a manner identical to that described in Example 1. Physical testing results are listed in Table 1.

EXAMPLE 4

A composition was prepared by mixing 29.78 parts hydrolyzed gamma-glycidoxypropyltrimethoxysilane with 13.54 parts tetraethoxysilane crosslinker, 90.74 parts colloidal silica in 40% isopropanol, 0.20 parts of an ionic surfactant, and 80.24 parts methanol. Next was added 1.50 parts Irgacure 261 (Ciba Geigy Corp.) photoinitiator, with the resulting solution being mixed again, followed by filtration. The composition was then applied to .cured diallyl diglycol carbonate lenses, which were then placed under a 375 watt infrared lamp (lamp distance, 1½ inches) for 17 seconds, and then irradiated in a manner identical to that described in Example 1. After UV irradiation, the coated lenses were postcured for 1½ minutes under a 375 watt infrared lamp (lamp distance, 3 inches). Physical testing results are listed in Table 1.

EXAMPLE 5

A composition was prepared by mixing 30.66 parts hydrolyzed gamma-glycidoxypropyltrimethoxysilane with 11.68 parts methyltrimethoxy-silane crosslinker, 94.02 parts colloidal silica in 40% isopropanol, 0.14 parts of a fluorosurfactant, 0.14 parts of a non-ionic surfactant, and 61.60 parts methanol. Next was added 1.76 parts Irgacure 261 (Ciba Geigy Corp.) photoinitiator, with the resulting solution being mixed again, followed by filtration. The composition was then applied to cured diallyl diglycol carbonate lenses, which were then placed under a 375 watt infrared lamp (lamp distance, 1½ inches) for 17 seconds, and then irradiated and postcured in a manner identical to that described in Example 1. Physical testing results are listed in Table 1.

EXAMPLE 6

A composition was prepared by mixing 23.70 parts hydrolyzed gamma-glycidoxypropyltrimethoxysilane with 16.83 parts methyltrimethoxy-silane crosslinker, 75.63 parts colloidal silica in isopropanol (IPA-ST Nissan Chemical Co.), 0.18 parts of a fluorosurfactant, 0.18 parts of a non-ionic surfactant, and 171.90 parts methanol. After mixing the resulting solution, 5.79 parts Irgacure 261 (Ciba-Geigy Corp.) photoinitiator and 5.79 parts cumene hydroperoxide were added, and the solution mixed and then filtered. The composition was then applied to cured diallyl diglycol carbonate lenses, which were then passed under two Fusion Systems "D" bulbs (200 watt bulbs) for a total irradiation time of 15 seconds, versus 30 seconds without the cumene hydroperoxide. The lenses were then postcured for 3 hours at 105° C. After cooling to room temperature, the lenses were subjected to physical testing, with the results listed in Table 1.

EXAMPLE 7

A composition was prepared by mixing 16.41 parts hydrolyzed gamma-glycidoxypropyltrimethoxysilane with 11.65 parts tetraethoxysilane, 52.60 parts colloidal silica in isopropanol (IPA-ST; NISSAN CHEMICAL CO.), 0.38 parts of a fluorosurfactant, and 118.47 parts methanol. Next, 0.50 parts Irgacure 261 photoinitiator (CIBA-GEIGY CORP.) was added, and the resulting solution mixed and then filtered. The composition was then applied to cured diallyl diglycol carbonate lenses, which were then irradiated and postcured in a manner identical to that described in Example 1. Physical testing results are listed in Table 1.

EXAMPLE 8

A composition was prepared by mixing 30.06 parts hydrolyzed gamma-glycidoxypropyltrimethoxysilane, 21.28 parts tetraethoxysilane, 92.06 parts colloidal silica in 40% isopropanol/60% water mixture, 54.82 parts methanol, 0.12 parts of a fluorosurfactant, 0.12 parts of a non-ionic surfactant, and 1.5 parts Irgacure 261 photoinitiator. The resulting solution was then thoroughly mixed and then filtered. The composition was then applied to cured diallyl diglycol carbonate lenses, which were then irradiated and postcured in a manner identical to that described in Example 1. Physical testing results are listed in Table 1.

EXAMPLE 9

A composition was prepared by mixing 44.37 parts hydrolyzed gamma-glycidoxypropyltrimethoxysilane, 20.28 parts tetraethoxysilane, 136.05 parts colloidal silica in 40% isopropanol/60% water, 96.33 parts methanol, 2.52 parts Irgacure 261 photoinitiator, 0.21 parts of a fluorosurfactant and 0.21 parts of a non-ionic surfactant. The resulting solution was thoroughly mixed and then filtered. The composition was then applied to cured diallyl diglycol carbonate lenses, which were then irradiated and postcured in a manner identical to that described in Example 1. Physical testing results are listed in Table 1.

This invention is clearly new and useful. Moreover, it was not obvious to those of ordinary skill in the art at the time it was made, in view of the prior art when considered as a whole.

It will thus be seen that the advantages of the present invention are efficiently attained and since certain changes may be made in the above construction without departing from the scope of the invention, it is intended that all matters contained in the foregoing description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. Radiation-curable and abrasion resistant coating composition consisting essentially of a monoepoxysilane, colloidal silica, an alkyltrialkoxysilane or tetraalkoxysilane, and an ultraviolet actuated photoinitiator in an amount sufficient to initiate a cationic cure of such composition.

2. Composition according to claim 1 wherein the photoinitiator is a photosensitive aromatic onium salt or an iron arene salt complex.

3. Composition according to claim 1 wherein the monoepoxysilane is of the formula

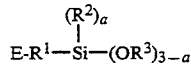

ps wherein E is a group containing a glycidoxy group or an epoxycyclohexyl group, or a mixture of both; $R^1$ is an alkylene group containing from 1 to 4 carbon atoms; $R^2$ and $R^3$ are alkyl groups containing from 1 to 4 carbon atoms; and a is an integer of 0 or 1.

4. Ophthalmic lens coated with the composition according to claim 1.

5. Radiation curable composition consisting essentially of
   (a) a hydrolyzable monoepoxysilane selected from the group consisting of a compound of the general formula

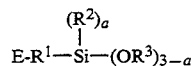

wherein E is a group containing a glycidoxy group or an epoxycyclohexyl group, or a mixture of both; $R^1$ is an alkylene group containing from 1 to 4 carbon atoms; $R^2$ and $R^3$ are alkyl groups containing from 1 to 4 carbon atoms; and a is an integer of 0 or 1,
   (b) an acidic dispersion of colloidal silica,
   (c) an alkyltrialkoxysilane or tetraalkoxysilane,
   (d) an ultraviolet radiation activated photoinitiator.

6. Composition according to claim 5 wherein the monoepoxysilane is gamma-glycidoxypropyltrimethoxysilane.

7. Composition according to claim 5 wherein the monoepoxysilane, is beta-(3,4-epoxycyclohexyl)-ethyl trimethoxysilane.

8. Composition according to claim 5 whereby the photoinitiator initiates a cationic cure.

9. Composition according to claim 8 wherein the photoinitiator is a photosensitive aromatic onium salt or an iron arene salt complex.

10. Composition according to claim 5 wherein the alkyltrialkoxysilane or tetraalkoxysilane is of the general formula

wherein
$R^4$ and $R^5$ are alkyl containing from 1 to 2 carbon atoms and x is an integer of 0 or 1.

11. Composition according to claim 10 wherein the alkyltrialkoxysilane or tetraalkoxysilane is methyltrimethoxysilane.

12. Composition according to claim 10 wherein the alkyltrialkoxysilane or tetraalkoxysilane is tetramethoxysilane.

13. Composition according to claim 10 wherein the photoinitiator is a photosensitive aromatic onium salt or an iron arene salt complex.

14. Composition according to claim 13 wherein the photoinitiator is a triarylsulfonium salt, an alkylated diaryl iodonium salt or mixtures thereof.

15. Composition according to claim 13 wherein the photoinitiator is an iron arene salt complex.

16. Ophthalmic lens coated with the composition according to claim 5.

17. A substantially non-tintable coating composition for ophthalmic lens to render the lens resistant to abrasion consisting essentially of from 10 to 50 weight percent solids, such solids comprising from 20 to 64 percent of hydrolyzed monoepoxysilane, from 15 to 40 percent alkyltrialkoxysilane or tetraalkoxysilane and from 30 to 60 percent colloidal silica; with the remainder of such composition comprising solvent.

18. Ophthalmic lens coated with the composition according to claim 17.

19. A substantially non-tintable coating composition for optical lens to render the lens resistant to consisting essentially of 5 to 25 parts by weight of a monoepoxysilane, 2.5 to 7 parts by weight of an alkyltrialkoxysilane or tetraalkoxysilane, 2.5 to 50 parts by weight of colloidal silica, 0.1 to 3 parts by weight of an ultraviolet activated photoinitiator sufficient to initiate a cationic cure of such composition, and 50 to 90 parts by weight of solvent.

20. Ophthalmic lens coated with the composition according to claim 19.

21. A substantially non-tintable coating composition for ophthalmic lens to render the lens resistant to abrasion consisting essentially of:
   (a) 5 to 25% by weight of a monoepoxysilane selected from the group consisting of a compound of the general formula $$E-R^1-\underset{\underset{(OR^3)_{3-a}}{|}}{Si}-(R^2)_a$$

wherein E is a Group containing a glycidoxy Group or an epoxycyclohexyl group, or a mixture of both; $R^1$ is an alkylene group containing from 1 to 4 carbon atoms; $R^2$ and $R^3$ are alkyl groups containing from 1 to 4 carbon atom; and (a) is an integer of 0 or 1;

(b) 2.5 to 7% weight of an alkylalkoxysilane or tetraalkoxysilane of the general formula $$R_x^4Si(OR^5)_{4-x}$$

wherein
$R^7$ and $R^8$ are alkyl containing from 1 to 2 carbon atoms,
and x is an integer of 0 or 1

(c) 2.5 to 50% by weight of colloidal silica dispersed in water, alcohol, or alcohol-water mixtures;

(d) 0.1 to 3% by weight of an ultraviolet activated photoinitiator capable of initiating a cationic cure and which is a photosensitive aromatic onium salt or an iron arene salt complex;

(e) 0.01 to 0.25% by weight of a surface active agent; and, (f) 50 to 90% by weight of solvent.

22. Composition according to claim 21 wherein the monoepoxysilane is gamma-glycidoxypropyl-trimethoxysilane; the alkyltrialkoxysilane is methyltrimethoxysilane; and the photoinitiator is a triaryl sulfonium salt, an alkylated diaryliodonium, or mixtures thereof.

23. Ophthalmic lens coated with the composition according to claim 22.

24. Composition according to claim 21 wherein the monoepoxysilane is gamma-glycidoxypropyltrimethoxysilane; the tetraalkoxysilane is tetraethoxysilane; and, the photoinitiator is an iron arene salt complex.

25. Ophthalmic lens coated with the composition according to claim 24.

26. Composition according to claim 21 wherein the monoepoxysilane is beta-(3,4-epoxycyclohexyl) ethyltrimethoxysilane; the alkyltrialkoxysilane is methyltrimethoxysilane; and, the photoinitiator is a triaryl sulfonium salt, an alkylated diaryliodonium salt, or mixtures thereof.

27. Ophthalmic, lens coated with the composition according to claim 26.

28. Composition according to claim 21 wherein the monoepoxysilane is beta-(3,4-epoxycyclohexyl) ethyltrimethoxysilane; the tetraalkoxysilane is tetraethoxysilane; and the photoinitiator is an arene salt complex.

29. Ophthalmic lens coated with the composition according to claim 28.

30. Coating composition consisting essentially of monoepoxysilane, colloidal silica, alkoltrialkoxysilane or tetraalkoxysilane, and iron arene salt complex, wherein the coating composition has the following characteristics:

(a) it is radiation curable, and,
(b) it is abrasion resistant.

31. Coating composition consisting essentially of
(a) monoepoxysilane of the formula $$E-R^1-\underset{\underset{(OR^3)_{3-a}}{|}}{Si}-(R^2)_a$$

wherein
E is glycidoxy or epoxycyclohexyl or a mixture of bonh,
$R^1$ is alkylene of 1 to 4 carbon atoms,
$R^2$ and $R^3$ are $C_{1-4}$ alkyl,
a is 0 or 1;

(b) colloidal silica;
(c) alkyltrialkoxysilane or tetraalkoxysilane of the formula $$r_x^4Si(OR^5)_{4-x}$$

wherein $R^4$ and $R^5$ are alkyl, have 1 to 2 carbon atoms and x is an integer of 0 or 1; and, (d) iron atone salt complex photoinitiator, wherein the coating composition ha the following characteristics:
(i) it is radiation curable, and,
(ii) it is abrasion resistant.

32. Composition according to claim 31 wherein the monoepoxysilane is gamma-glycidoxypropyltrimethoxysilane.

33. Composition according to claim 31 wherein the monoepoxysilane is beta-(3,4-epoxycyclohexyl)-ethyltrimethoxysilane.

34. Composition according to claim 31 wherein the alkyltrialkoxysilane is methyltrimethoxysilane.

35. Composition according to claim 31 wherein the tetraalkoxysilane is tetramethoxysilane.

* * * * *